(12) United States Patent
Bager et al.

(10) Patent No.: US 11,365,722 B2
(45) Date of Patent: Jun. 21, 2022

(54) INSULATED SHAFT JOINT

(71) Applicant: Vestas Wind Systems A/S, Aarhus N. (DK)

(72) Inventors: Christian Bager, Herne (DE); Noel Yambeh Yambaha, Berlin (DE)

(73) Assignee: Vestas Wind Systems A/S, Aarhus N (DK)

( * ) Notice: Subject to any disclaimer, the term of this patent is extended or adjusted under 35 U.S.C. 154(b) by 581 days.

(21) Appl. No.: 16/472,945

(22) PCT Filed: Nov. 17, 2017

(86) PCT No.: PCT/DK2017/050382
§ 371 (c)(1),
(2) Date: Jun. 24, 2019

(87) PCT Pub. No.: WO2018/121819
PCT Pub. Date: Jul. 5, 2018

(65) Prior Publication Data
US 2019/0360467 A1     Nov. 28, 2019

(30) Foreign Application Priority Data
Dec. 29, 2016 (DK) .......................... PA 2016 71059

(51) Int. Cl.
*F03D 15/00*       (2016.01)
*F16C 3/02*       (2006.01)

(52) U.S. Cl.
CPC ................ *F03D 15/00* (2016.05); *F16C 3/02* (2013.01); *F05B 2240/60* (2013.01); *F16C 2360/31* (2013.01); *Y02E 10/72* (2013.01)

(58) Field of Classification Search
CPC .. F03B 15/00; Y02E 10/72; F16C 3/02; F16C 2350/31; F05B 2240/60
See application file for complete search history.

(56) References Cited

U.S. PATENT DOCUMENTS

| 2,089,168 | A | * | 8/1937 | Brown | ................... | F16D 1/0882 |
| | | | | | | 403/259 |
| 5,807,180 | A | * | 9/1998 | Knodle | ................. | F16D 1/0882 |
| | | | | | | 464/144 |
| 2012/0205214 | A1 | | 8/2012 | Steinberger et al. | | |

FOREIGN PATENT DOCUMENTS

| CN | 201771983 U | 3/2011 |
| DE | 202016105419 U1 | 10/2016 |

(Continued)

OTHER PUBLICATIONS

Danish Patent and Trademark Office, Search and Examination Report in PA 2016 71059, dated May 23, 2017.

(Continued)

*Primary Examiner* — Sean Gugger
(74) *Attorney, Agent, or Firm* — Wood Herron & Evans LLP (57) ABSTRACT

The present invention relates to an insulated shaft joint (1) for electrically insulating a rotational member (2) from an end section of a shaft (3) to which the rotational member (2) is connected. The insulated shaft joint (1) comprises a plurality of first grooves (4) arranged in an outer surface of the end section of the shaft (3) and extending in an axial direction of the shaft (3), one or more rows of electrically insulating members (5), and an annular electrically insulating cage (6) arranged circumferentially around the plurality of first grooves (4). The insulating cage (6) comprises one or more rows of through-going openings (7), arranged circumferentially. The through-going openings (7) is being shaped and dimensioned so that they are adapted to surround and guide the insulating members (5). The rotational member (2) is arranged circumferentially around the annular electrically insulating cage (6). The rotational member (2) comprises a plurality of second grooves (8) arranged in an inner surface of the rotational member (2) and extending in an axial (Continued)

direction of shaft (3). The through-going openings (7) in the insulating cage (6) are arranged aligned with the plurality of first grooves (4) and the plurality of second grooves (8). The insulating members (5) are arranged in the through-going openings (7) of the insulating cage (6) and in the first and second grooves, so as to be adapted to transfer torque from the shaft to the rotational member (2) via the insulating members (5).

18 Claims, 6 Drawing Sheets

(56) References Cited

FOREIGN PATENT DOCUMENTS

| EP | 2397690 A1 | 12/2011 |
|----|------------|---------|
| EP | 2441954 A2 | 4/2012 |
| EP | 2740933 A1 | 6/2014 |
| GB | 1490805 A | 11/1977 |
| WO | 2010069325 A1 | 6/2010 |
| WO | 2012107299 A1 | 8/2012 |

OTHER PUBLICATIONS

European Patent Office, International Search Report and Written Opinion in PCT Application No. PCT/DK2017/050382, dated Feb. 23, 2018.

\* cited by examiner

INSULATED SHAFT JOINT

FIELD OF THE INVENTION

The present invention relates to an insulated shaft joint for electrically insulating a rotational member from an end section of a shaft to which the rotational member is connected.

BACKGROUND OF THE INVENTION

Wind turbines are used to gather wind energy and to transform the energy into another form of energy, typically electrical energy. For this purpose, most wind turbines include a main shaft which at one end is coupled to the blades of the wind turbine and at the opposite end is connected to a driven wind turbine part. This driven wind turbine part may be an input shaft of a gearbox or an input shaft or torque transferring member of an electric energy generator.

In the modern wind turbines, electrical currents discharging from the generator and penetrating the interface connection with the output shaft from the gearbox might occur. This may cause electro corrosion on the bearings, couplings and other gearbox parts.

The up to date solution to this problem is to use insulating shafts that are used as a connection between wind turbine gears and generators. Such shafts consist of metal flanges that are connected permanently with the shaft at both ends by a high-strength adhesive. The drawback of this up to date solution is that the insulating shaft is fixedly arranged between the gearbox and the generator and is thus not detachable.

Hence, an improved insulated coupling assembly would be advantageous, in order to ensure an efficient insulation.

OBJECT OF THE INVENTION

It is an object of the present invention to electrically insulate a rotational member from an end section of a shaft to which the rotational member is connected.

It is another object of the present invention to provide an assembly which can be disassembled if necessary.

It is a further object of the present invention to provide an alternative to the prior art.

SUMMARY OF THE INVENTION

In a first aspect, the present invention relates to an insulated shaft joint for electrically insulating a rotational member from an end section of a shaft to which the rotational member is connected. The insulated shaft joint comprises
  a plurality of first grooves arranged in an outer surface of the end section of the shaft and extending in an axial direction of the shaft,
  a plurality of electrically insulating members, and
  an annular electrically insulating cage arranged circumferentially around the plurality of first grooves, the insulating cage comprising one or more through-going openings arranged circumferentially, the through-going openings being shaped and dimensioned so that they are adapted to surround and guide the insulating members
wherein
  the rotational member is arranged circumferentially around the annular electrically insulating cage, the rotational member comprising a plurality of second grooves arranged in an inner surface of the rotational member and extending in an axial direction of the shaft,
  the through-going openings in the insulating cage are arranged aligned with the plurality of first grooves and the plurality of second grooves, and
  the insulating members are arranged in the through-going openings of the insulating cage and in the first and second grooves, so as to be adapted to transfer torque from the shaft to the rotational member via the insulating members.

The insulating members are preferably circumferentially arranged in one or more rows.

The plurality of first and second grooves ensures an easy assembly of the shaft and the rotational member, regardless of an axial misalignment.

The insulating members and the through going openings may also be arranged in an alternative arrangement around the insulating cage, in such a way, that the through going openings are arranged aligned with the plurality of first grooves and the plurality of second grooves, and that the insulating members are evenly distributed, so as to transfer the torque evenly from the shaft to the rotational member, during use.

In some embodiments of the invention, the insulated shaft joint may comprise two or more, such as three or more, rows of electrically insulating members.

Preferably, the first and second grooves each has a semi-circular cross-section.

The first and second grooves are preferably evenly distributed on the circumference. Hereby is obtained an evenly transfer of the torque from the shaft to the rotational member, during use.

The electrically insulating members may be in the form of ceramic rollers.

In some embodiments of the invention, the insulating members may be in the form of ceramic balls. These ceramic balls may be identical to those in hybrid bearings presently used in the wind turbine industry. This has the advantage of the option to be reliably installed in an insulated shaft joint, as it is known that the ceramic balls can resist the electrical discharges and mechanical stresses occurring in a wind turbine and that they have a sufficient lifetime.

Preferably, the ceramic balls are made of Silicon Nitride and may have a hardness of less than 3000 Vickers, such as less than 2000 Vickers, preferably around 1550 Vickers.

The insulating cage is preferably made of or comprises plastic. Hereby an electrically insulating effect is obtained, as plastic has good insulating properties.

The insulated shaft joint as described above may be arranged in between a gearbox and a generator.

The shaft, in which the insulated shaft joint may be arranged, may be a shaft arranged in a wind turbine.

In a second aspect, the present invention relates to a wind turbine comprising:
  a tower, a nacelle mounted on top of the tower, a hub, at least two wind turbine blades arranged on the hub, a gear box, a generator, and
  a main shaft adapted to transfer a low speed rotational movement of the hub to a high speed rotational movement of an input shaft of the generator via the gear box,
wherein an output shaft of the gear box is connected to the input shaft of the generator via an insulated shaft joint according to the first aspect of the present invention. Hereby an electrical current across the generator and the turning parts of a gearbox is avoided.

In a third aspect, the present invention relates to a method of electrically insulating an end section of a shaft from a rotational member, the method utilizing an insulated shaft joint according to the present invention.

In the present context, a number of terms are used in a manner being ordinary to a skilled person; however, some of these terms are elucidated below:

Insulation is preferably used to denote a material that prevents the progression or transmission of electricity from one item or medium to another.

Cage is preferably used to denote a device to surround the insulating members and hold them in a desired position.

The first, second and third aspects of the present invention may be combined. These and other aspects of the invention will be apparent from and elucidated with reference to the embodiments described hereinafter.

BRIEF DESCRIPTION OF THE FIGURES

The insulated shaft joint according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
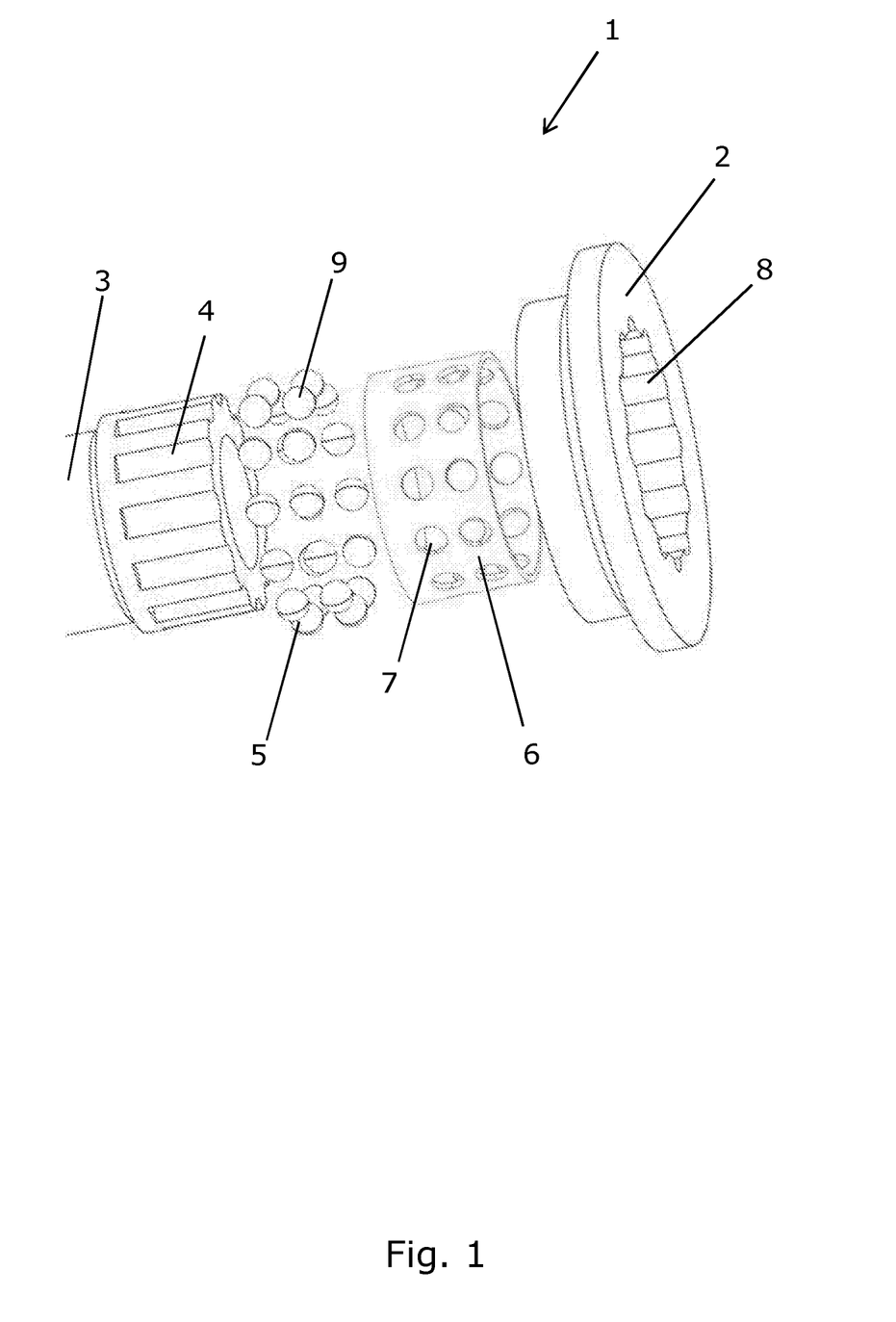
FIG. 1 schematically shows an exploded view of a connection between a shaft and a rotational member via an insulated shaft joint according to the present invention.

FIG. 1 schematically shows an example of an insulated shaft joint 1, according to the present invention, for electrically insulating a rotational member 2 from an end section of a shaft 3.

In FIG. 1 the parts of the insulated shaft joint 1 are shown in exploded view as before assembly. The insulated shaft joint comprises a shaft 3, a rotational member 2, a plurality of first grooves 4, two rows of electrically insulating members 5, an annular electrically insulating cage 6, two rows of through-going openings 7 and a plurality of second grooves 8.

The insulating members 5 are arranged in the through-going openings 7 of the insulating cage 6 and in the first 4 and second 8 grooves, so as to be adapted to transfer torque from the shaft 3 to the rotational member 2 via the insulating members 5.

The plurality of first grooves 4 are arranged in an outer surface of the end section of the shaft 3 and extending in an axial direction of the shaft 3. In the illustrated embodiment of the present invention, the first grooves 4 are evenly distributed on the circumference. In the embodiment in FIG. 1, the first grooves 4 have a semi-circular cross-section, being shaped so the insulating members can fit into the first grooves. The insulating members 5 may have various forms.

The first grooves may have another shape, but must in any case be adapted to receive the insulating member, and to engage with the insulating cage 6 via the insulating members. The first grooves 4 extend in an axial direction of the shaft 3, and the length of this extension is dependable of the number of rows of the insulating members 5.

Figure 5:
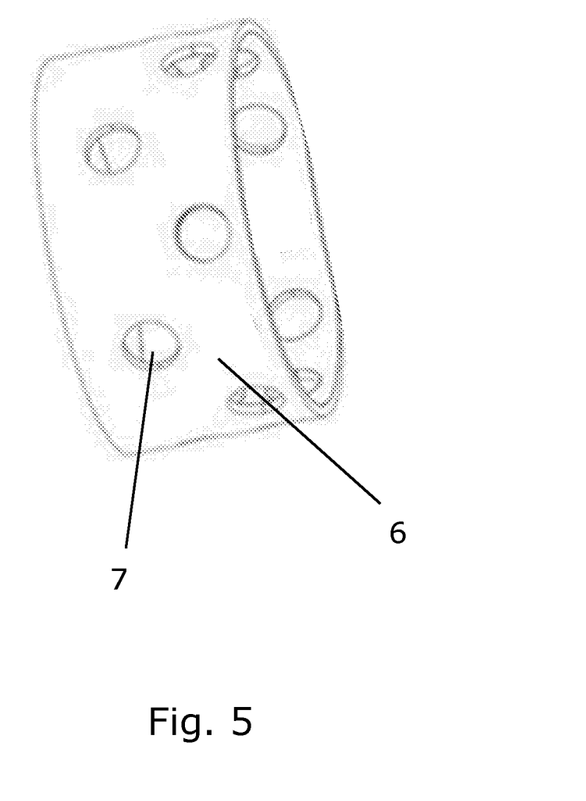
FIG. 5 schematically shows an embodiment of the insulating cage.

An annular electrically insulating cage 6 is arranged circumferentially around the plurality of first grooves 4. The illustrated insulating cage 6 comprises two rows of through-going openings 7, but they may also be arranged in an alternative arrangement around the insulating cage, in such a way, that the through goings openings 7 are arranged aligned with the plurality of first grooves 4 and the plurality of second grooves 8. Preferably, the insulating members are evenly distributed, so as to transfer the torque evenly from the shaft to the rotational member, during use. An example of an alternative arrangement of the through goings openings 7 is illustrated in FIG. 5. The through-going openings 7 are shaped and dimensioned so that they are adapted to surround and guide the insulating members 5.

Preferably, the through-going openings 7 in the insulating cage 6 are arranged aligned with the plurality of first grooves 4 and the plurality of second grooves 8.

The insulating cage 6 is preferably made of plastic or comprises plastic. Hereby it is obtained that besides guiding and surrounding the insulating members 5, the insulating cage is also preventing an electrical charge, also referred to as capacitance, between the shaft and the rotational member that may be created in the otherwise free space between the shaft and the rotational member, if the insulating members were arranged without the insulating cage 6.

The plastic used in the insulating cage 6 needs to be heat and chemically resistant, because the temperature can reach 80-90 C in the shaft joint. Further, the typical radial distance between the first grooves and the second grooves is 10-12 mm and the insulating cage 6 could advantageously be made to fit that distance. The insulating cage 6 has no relative movement to the shaft 3 or hub. It shall be axial fixed to the shaft 3 or hub (not shown in the drawing).

The rotational member 2 is arranged circumferentially around the annular electrically insulating cage 6. The rotational member 2 comprises a plurality of second grooves 8 arranged in an inner surface of the rotational member 2 and extending in an axial direction of shaft 3. In the illustrated embodiments, the second grooves 8 each have a semi-circular cross-section being shaped so that the insulating members can fit into the second grooves. The second grooves may have another shape, but in any case they must be adapted to receive the insulating member 5, and to engage with the insulating cage 6. The second grooves 8 extend in an axial direction of the shaft 3, and the length of this extension is preferably dependable of the number of rows of the insulating members 5.

In FIG. 1, two rows of insulating members 5 are disclosed and the insulating member 5 are in the form of balls 9. However, two or more, such as three or more rows of insulating members may be used, wherein the insulating members may be in the form of balls, rollers, or cubes made of insulating material, such as ceramic. An embodiment wherein a mix of different forms of insulating members 5 may also be implemented. More rows of insulating members provides more load-carrying ability to the shaft joint, than one row for a given shape and dimension.

In FIG. 1, the end section of the shaft 3, where the first grooves 4 are arranged, has a larger outer diameter than the shaft 3. This is mainly to ensure a sufficient amount of material at the bottom of the first grooves 4, especially when the shaft 3 is a hollow shaft.

In FIG. 1, the insulating members 5 are illustrated as being in the form of balls 9. Such balls may be ceramic balls which are already used in generator hybrid bearing to avoid bearing failures due to electrical current. These ceramic balls are applicable in the present invention due to their high load capacity, form stability and tight tolerances.

The ceramic balls typically have a hardness of 1550 Vickers and is made of Silicon Nitride. The electricity resistivity is typically in the range of $10^{14}$ Ohm-cm. Compared to ordinary steel, these ceramic balls are typically 58% lighter, 121% harder and have a 70% lower thermal expansion coefficient.

Figure 2:
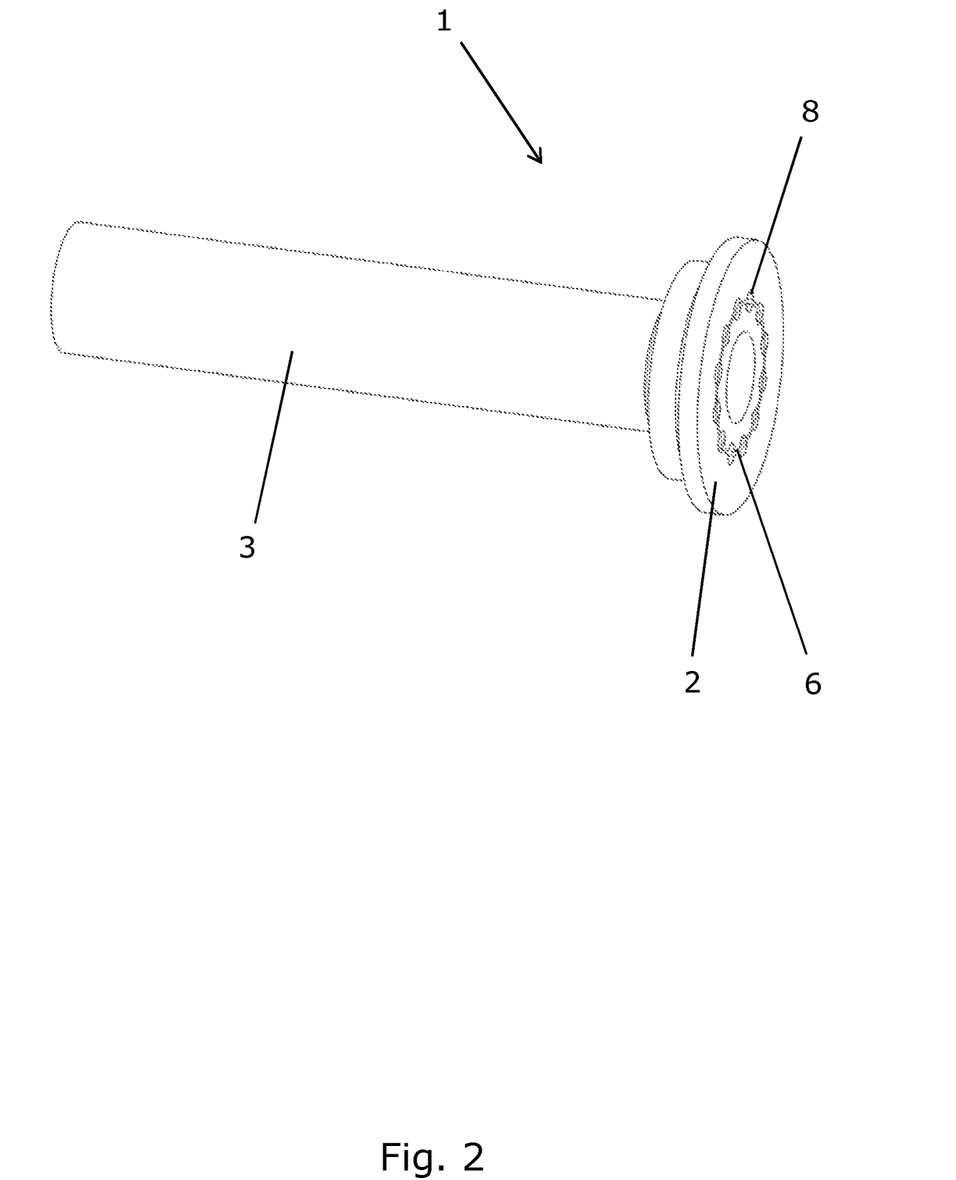
FIG. 2 schematically shows a shaft and a rotational member connected by an insulated shaft joint, after assembly of the parts.

In FIG. 2, the insulated shaft joint is illustrated in an assembled condition. When the insulated shaft joint is assembled and ready for use, the rotational member 2 is connected to the end section of the shaft 3. The shaft 3 may be arranged in between a gearbox and a generator. The shaft 3 may be arranged in a wind turbine.

Figure 3:
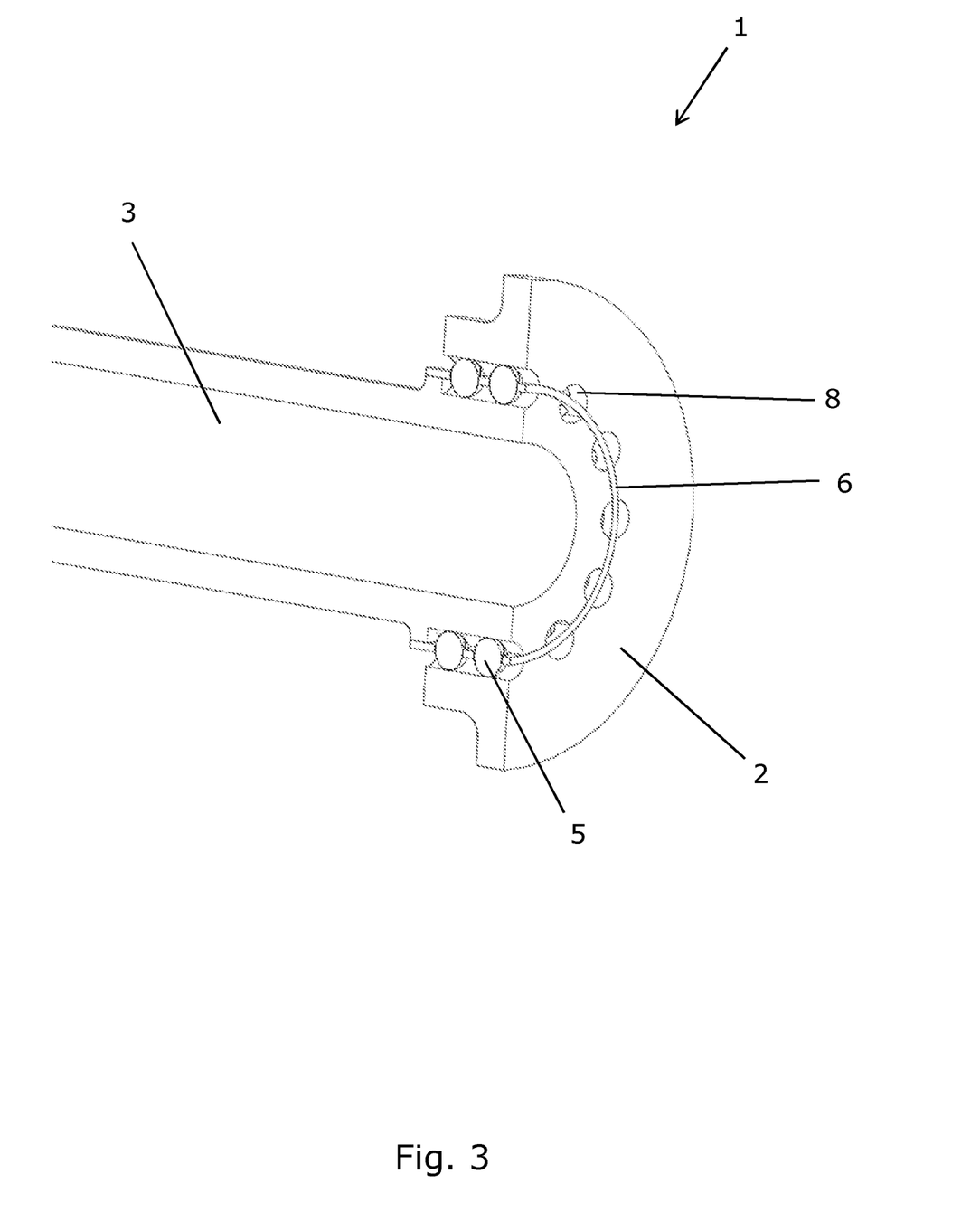
FIG. 3 is a cross-sectional partial view of the insulated shaft joint assembly in FIG. 2.

In FIG. 3 the insulated shaft joint is shown in an assembled condition from a cross sectional and partial view. In the embodiment of the present invention shown in FIG. 3, there are two rows of insulating members; however, the insulated shaft joint 1 could also comprise three or more rows of electrically insulating members 5.

The present invention is made in relation to wind turbines and for electrically insulating a rotational member from an end section of a shaft, such as an output shaft from a gearbox to the interface of a generator.

Figure 4:
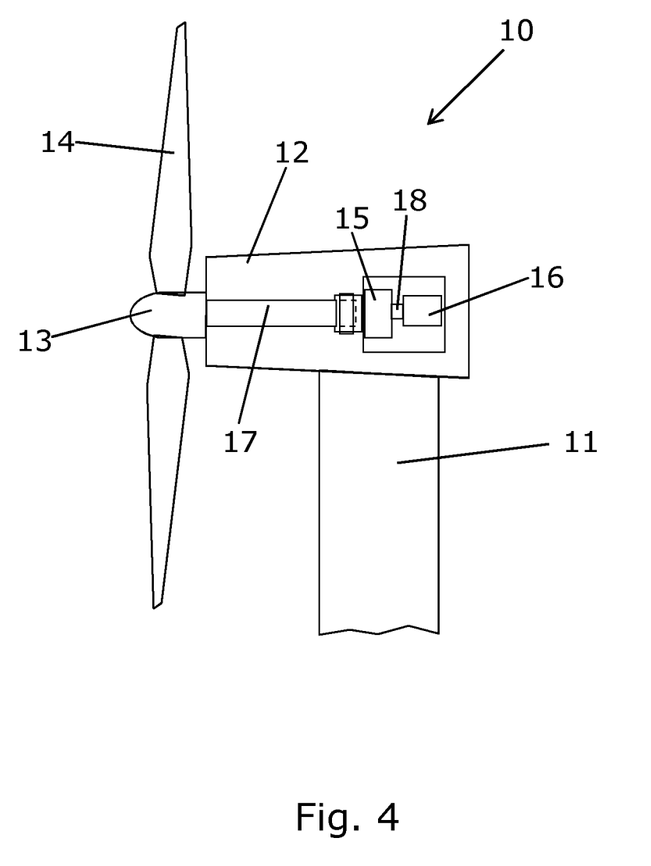
FIG. 4 schematically shows a known wind turbine.

FIG. 4 schematically shows an example of a known wind turbine. The wind turbine comprises a tower 11, a nacelle 12 mounted on top of the tower, a hub 13, at least two wind turbine blades 14 arranged on the hub, a gear box 15, a generator 16 and a main shaft 17 adapted to transfer a low speed rotational movement of the hub to a high speed rotational movement of an input shaft of the generator 16 via the gear box 15. The hub typically has three blades 14 attached to the hub. The torque to be transferred is a result of a force provided by the wind to the blades 14 and via the main shaft 17. The output shaft 18, which is consistent with the shaft 3 in FIG. 1, of the gear box 15 is connected to the input shaft of the generator 16 via an insulated shaft joint 1 (not shown in FIG. 4). The rotational member 2 is connected to the interface of the generator 16. The functionality of the insulated shaft joint is to prevent electrical current across the generator and the turning parts of a gearbox, and to assure high torque transmission from the output shaft of the gearbox to the interface connection to the generator.

Figure 6:
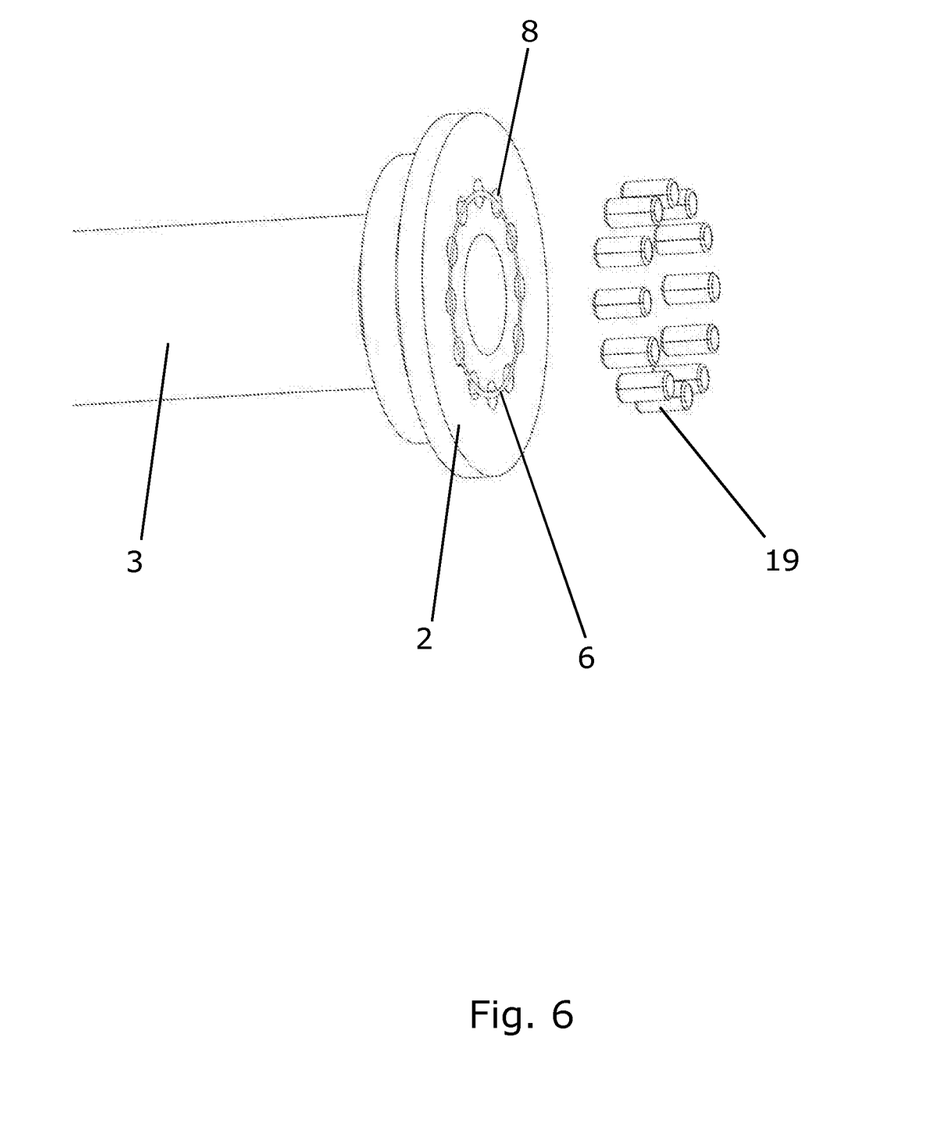
FIG. 6 schematically shows an embodiment of the insulated shaft joint, wherein the insulating members are in the form of rollers.

FIG. 6 schematically shows an embodiment of the present invention, wherein the insulating members are in the form of rollers 19, preferably ceramic rollers.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCES

1. Insulated shaft joint
2. Rotational member
3. Shaft
4. First grooves
5. Insulating members
6. Insulating cage
7. Through-going opening
8. Second grooves
9. Balls
10. Wind turbine
11. Tower
12. Nacelle
13. Hub
14. Wind turbine blade
15. Gear box
16. Generator
17. Main shaft
18. Output shaft
19. Roller

The invention claimed is:

1. An insulated shaft joint for electrically insulating a rotational member from an end section of a shaft to which the rotational member is connected, the insulated shaft joint comprising:
   a plurality of first grooves arranged in an outer surface of the end section of the shaft and extending in an axial direction of the shaft,
   a plurality of electrically insulating members, and
   an annular electrically insulating cage arranged circumferentially around the plurality of first grooves, the insulating cage comprising one or more through-going openings arranged circumferentially, the through-going openings being shaped and dimensioned so that they are adapted to surround and guide the insulating members:
   wherein
   the rotational member is arranged circumferentially around the annular electrically insulating cage, the rotational member comprising a plurality of second grooves arranged in an inner surface of the rotational member and extending in an axial direction of the shaft,
   the through-going openings in the insulating cage are arranged aligned with the plurality of first grooves and the plurality of second grooves, and
   the insulating members are arranged in the through-going openings of the insulating cage and in the first and second grooves, so as to be adapted to transfer torque from the shaft to the rotational member via the insulating members.

2. The insulated shaft joint according to claim 1, wherein the insulating members and through going openings are arranged in one or more rows.

3. The insulated shaft joint according to claim 2, comprising two or more rows of electrically insulating members.

4. The insulated shaft joint according to claim 1, wherein the first and second grooves each have a semi-circular cross-section.

5. The insulated shaft joint according to claim 1, wherein the first and second grooves are evenly distributed on the circumference.

6. The insulated shaft joint according to claim 1, wherein the electrically insulating members are in the form of rollers.

7. The insulated shaft joint according to claim 1, wherein the electrically insulating members are in the form of balls.

8. The insulated shaft joint according to claim 1, wherein the insulating cage is made of or comprises plastic.

9. An insulated shaft joint according to claim 1, wherein the insulated shaft joint is arranged in between a gearbox and a generator.

10. The insulated shaft joint according to claim 1, wherein the shaft is a shaft arranged in a wind turbine.

11. A wind turbine comprising:
- a tower, a nacelle mounted on top of the tower, a hub, at least two wind turbine blades arranged on the hub, a gear box, a generator, and
- a main shaft adapted to transfer a low speed rotational movement of the hub to a high speed rotational movement of an input shaft of the generator via the gear box wherein an output shaft of the gear box is connected to the input shaft of the generator via an insulated shaft joint according to claim 1.

12. A method of electrically insulating an end section of a shaft from a rotational member, the method utilizing an insulated shaft joint according to claim 1.

13. The insulated shaft joint according to claim 2, comprising three or more rows of electrically insulating members.

14. The insulated shaft joint according to claim 1, wherein the electrically insulating members are in the form of ceramic rollers.

15. The insulated shaft joint according to claim 1, wherein the electrically insulating members are in the form of ceramic balls.

16. The insulated shaft joint according to claim 15, wherein the ceramic balls are made of silicon Nitride and have a hardness of less than 3000 Vickers.

17. The insulated shaft joint according to claim 15, wherein the ceramic balls are made of silicon Nitride and have a hardness of less than 2000 Vickers.

18. The insulated shaft joint according to claim 15, wherein the ceramic balls are made of silicon Nitride and have a hardness of less than 1550 Vickers.

* * * * *